US009212916B2

(12) United States Patent
Moosavi et al.

(10) Patent No.: US 9,212,916 B2
(45) Date of Patent: Dec. 15, 2015

(54) SYSTEMS AND METHODS FOR INDOOR NAVIGATION

(71) Applicant: BLACKBERRY LIMITED, Waterloo (CA)

(72) Inventors: Vahid Moosavi, Kitchener (CA); Mamdouh Kamal Yanni, Kitchener (CA)

(73) Assignee: BlackBerry Limited, Waterloo (CA)

( * ) Notice: Subject to any disclaimer, the term of this patent is extended or adjusted under 35 U.S.C. 154(b) by 183 days.

(21) Appl. No.: 13/786,663

(22) Filed: Mar. 6, 2013

(65) Prior Publication Data

US 2014/0149033 A1    May 29, 2014

Related U.S. Application Data

(60) Provisional application No. 61/729,793, filed on Nov. 26, 2012.

(51) Int. Cl.
*G01C 17/30* (2006.01)
*G01C 21/20* (2006.01)
*G01S 5/02* (2010.01)
*G01C 21/16* (2006.01)

(52) U.S. Cl.
CPC .............. *G01C 21/206* (2013.01); *G01C 21/16* (2013.01); *G01S 5/02* (2013.01)

(58) Field of Classification Search
CPC ...... G01C 21/206; G01C 17/30; G01C 21/20; G01C 25/00; G01S 5/0236; G01S 1/68; G01S 5/02; G01S 5/0284; G01S 5/0242; H04W 4/043; H04W 4/02; H04W 64/00; H04W 4/022; H04W 4/021
USPC ........ 701/430, 431; 342/386, 450; 340/686.1; 455/456.1, 456.2; 702/116
See application file for complete search history.

(56) References Cited

U.S. PATENT DOCUMENTS

| 8,781,494 B2 * | 7/2014 | Kuehnel ...................... 455/456.1 |
| 2005/0288858 A1 * | 12/2005 | Amer et al. .................... 701/211 |
| 2006/0184013 A1 * | 8/2006 | Emanuel et al. ............... 600/426 |
| 2009/0085806 A1 * | 4/2009 | Piersol et al. .................. 342/386 |
| 2010/0127883 A1 * | 5/2010 | Chou ........................... 340/686.1 |
| 2011/0050493 A1 * | 3/2011 | Torimoto et al. ......... 342/357.29 |
| 2012/0028649 A1 * | 2/2012 | Gupta et al. ............... 455/456.1 |
| 2013/0053067 A1 * | 2/2013 | Aggarwal et al. .......... 455/456.2 |
| 2013/0099977 A1 * | 4/2013 | Sheshadri et al. ............. 342/450 |
| 2013/0338958 A1 * | 12/2013 | Shanishchara et al. ........ 702/116 |
| 2014/0243015 A1 * | 8/2014 | Basha et al. ............... 455/456.1 |

OTHER PUBLICATIONS

European Patent Office, extended European Search Report dated Jul. 15, 2014, issued in European Patent Application No. 13158065.6.

(Continued)

*Primary Examiner* — Tuan C. To
*Assistant Examiner* — Yuri Kan
(74) *Attorney, Agent, or Firm* — Ridout and Maybee LLP

(57) ABSTRACT

Systems (100), methods (400), devices (110, 120, 1006, 952), and computer programming products for improved navigation inside buildings and in other locations, using both passive and active NFC-capable devices, in conjunction with inertial and/or magnetic devices (8242, 8134, 8135).

19 Claims, 9 Drawing Sheets

(56) References Cited

OTHER PUBLICATIONS

Busra Ozdenizci, Kerem Ok, Vedat Coskun, Mehmet N. Aydin, Development of an Indoor Navigation System Using NFC Technology, The Fourth International Conference on Information and Computing Science, Apr. 25-27, 2011.

European Patent Office, Partial Search Report dated Mar. 27, 2014, issued in European Patent Application No. 13158065.6.

* cited by examiner

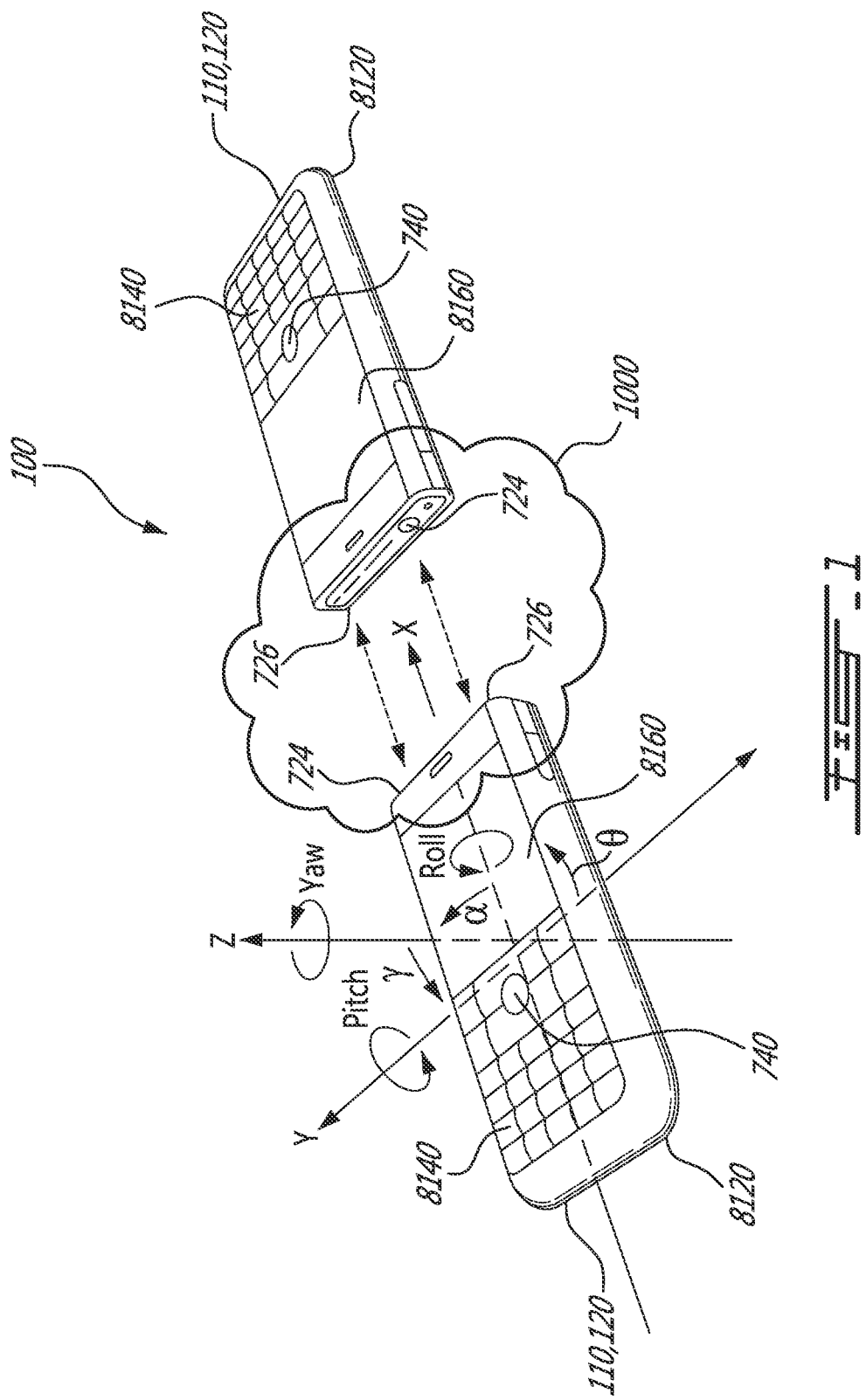

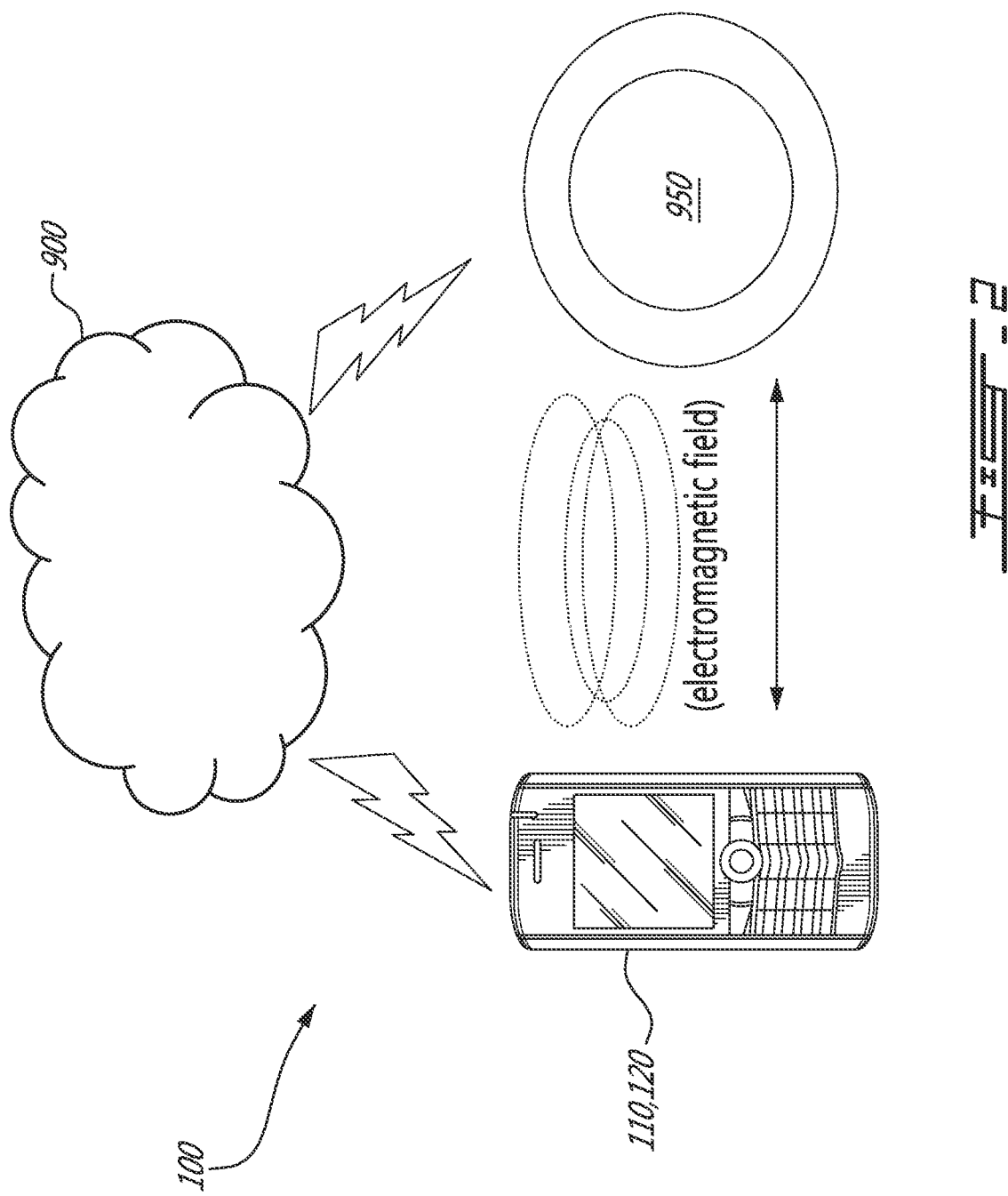

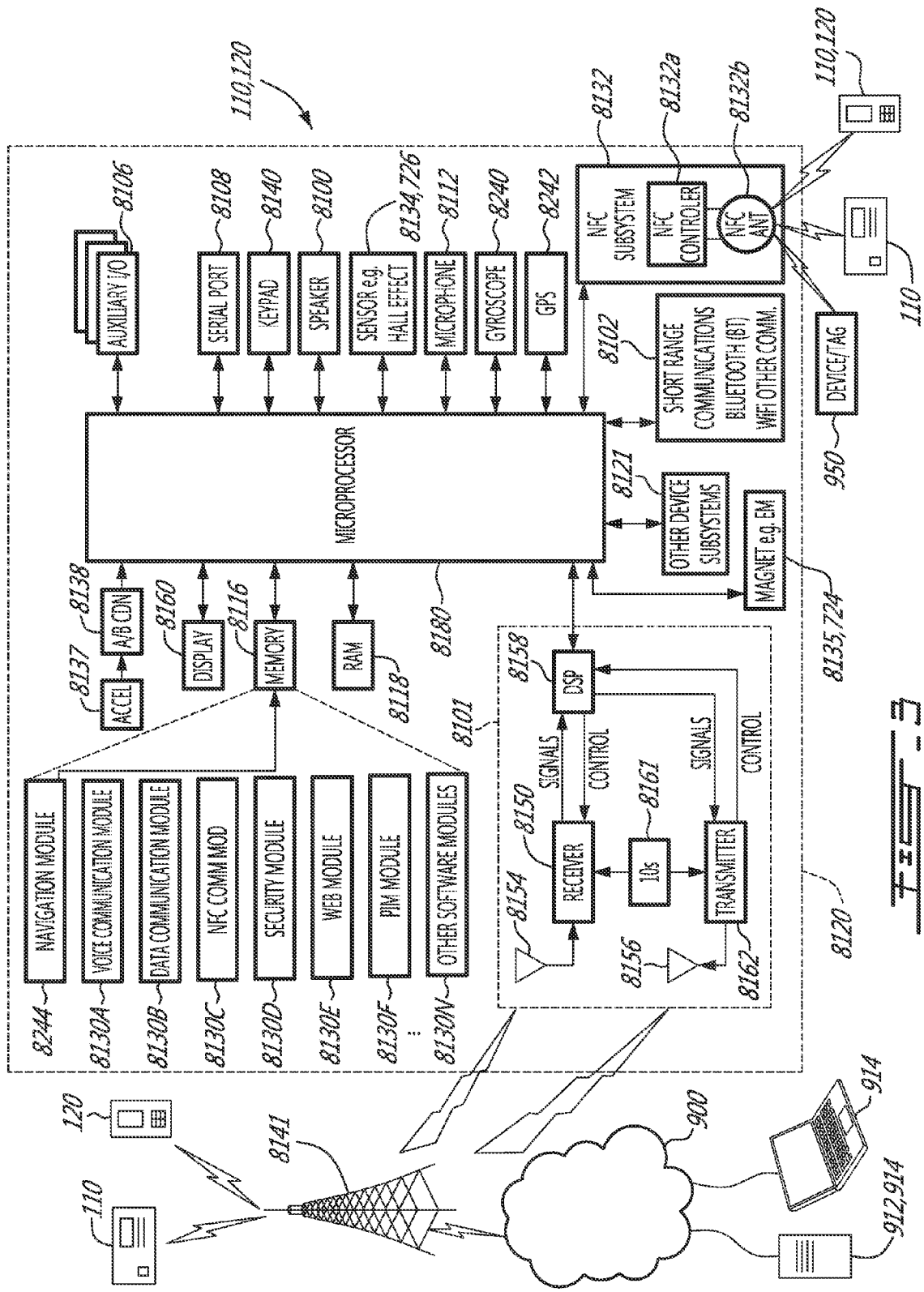

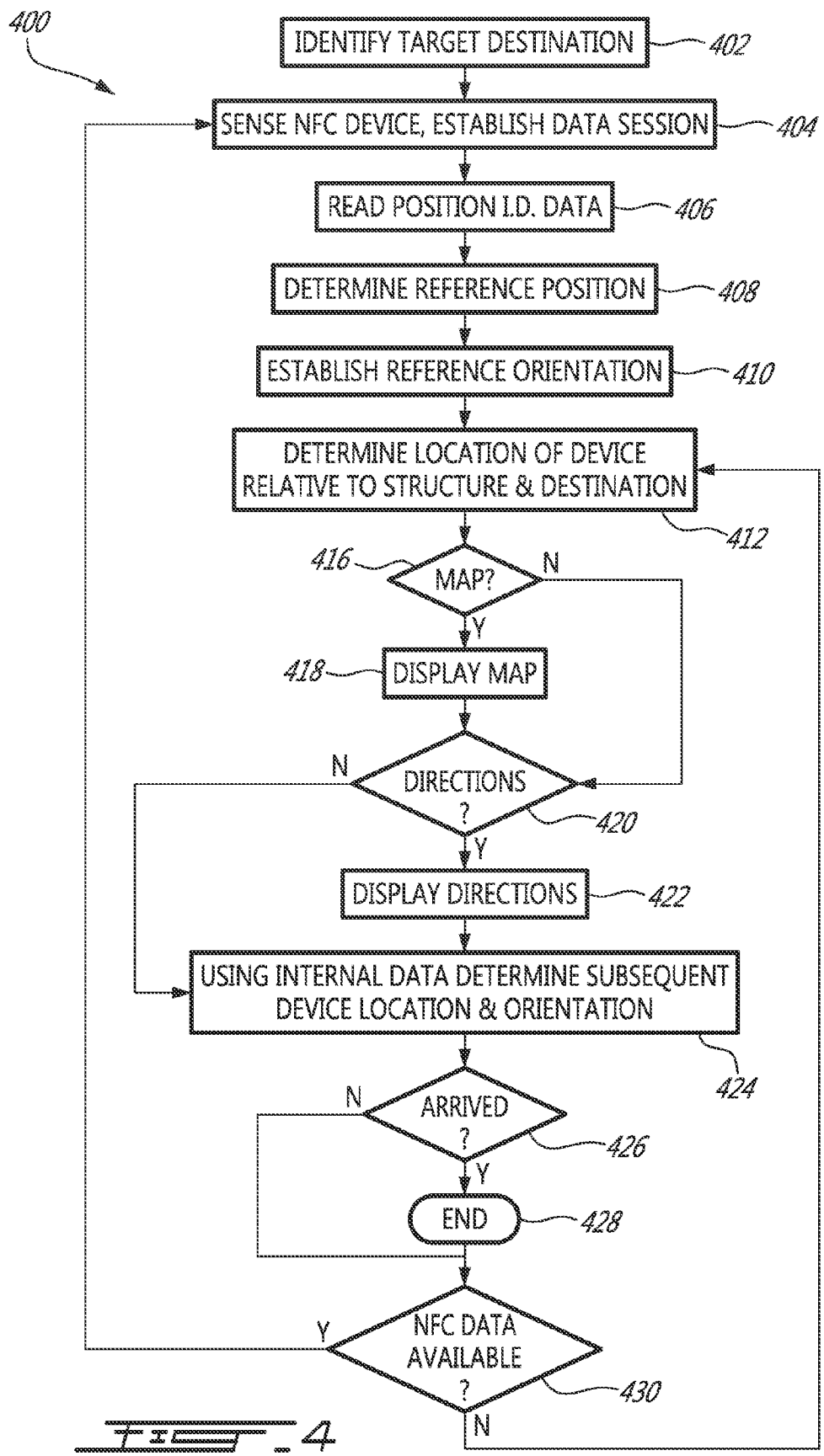

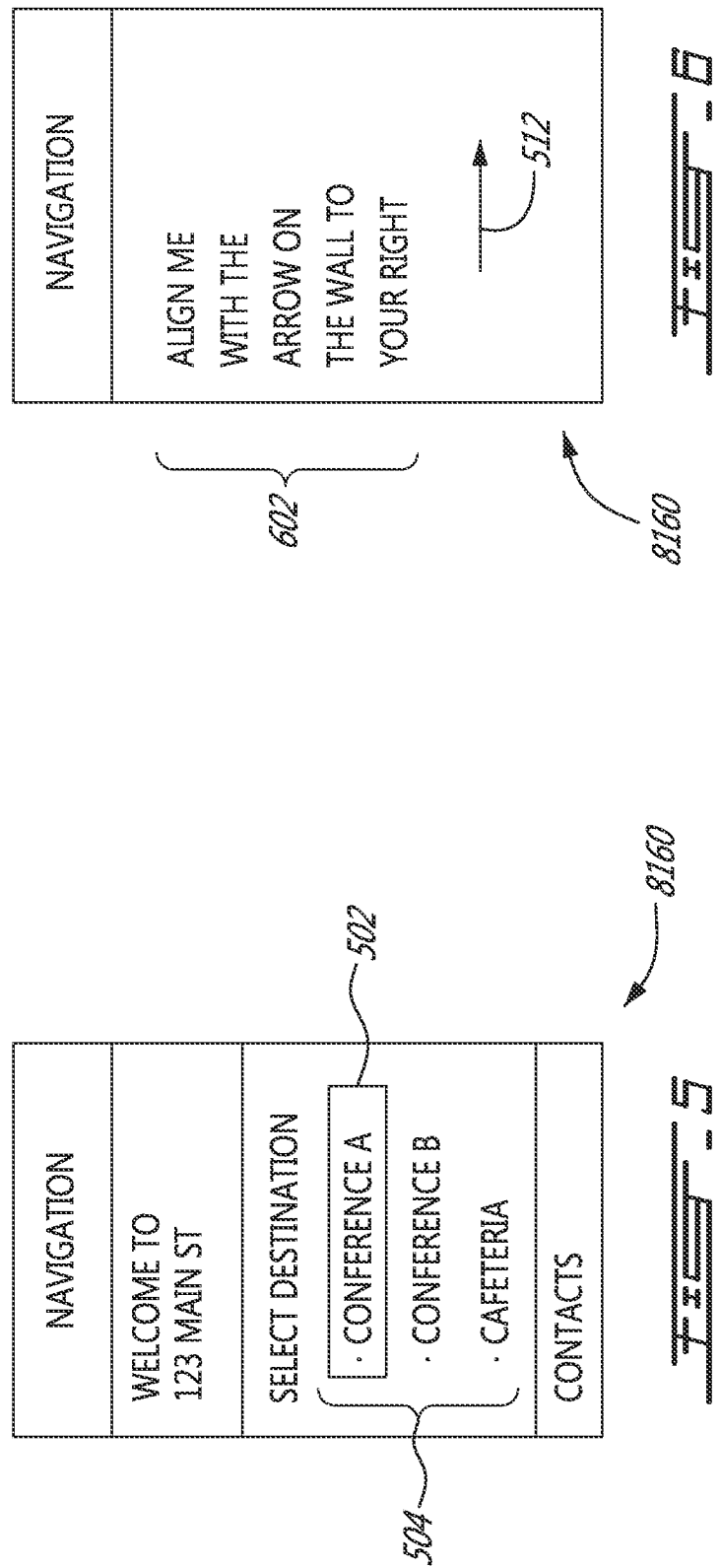

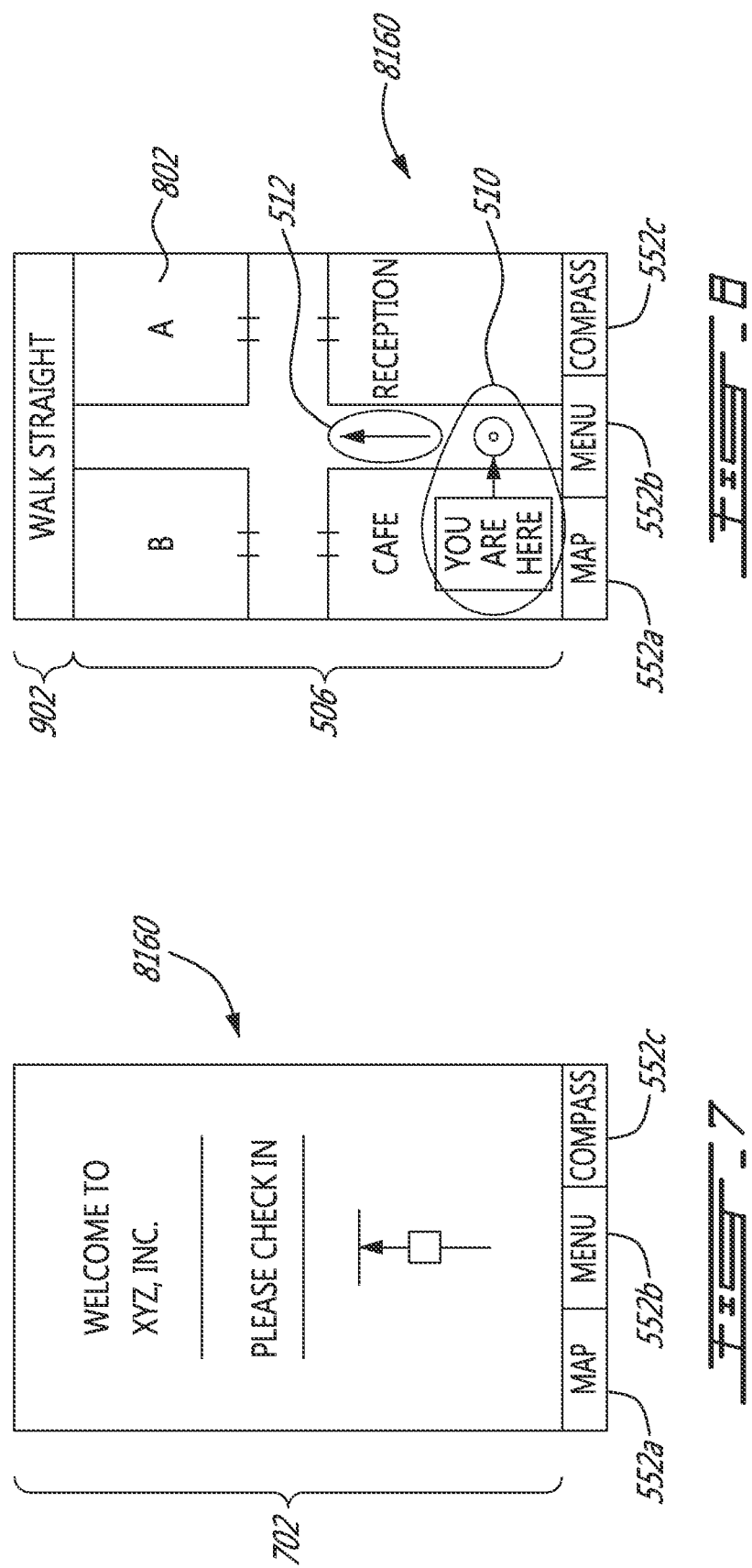

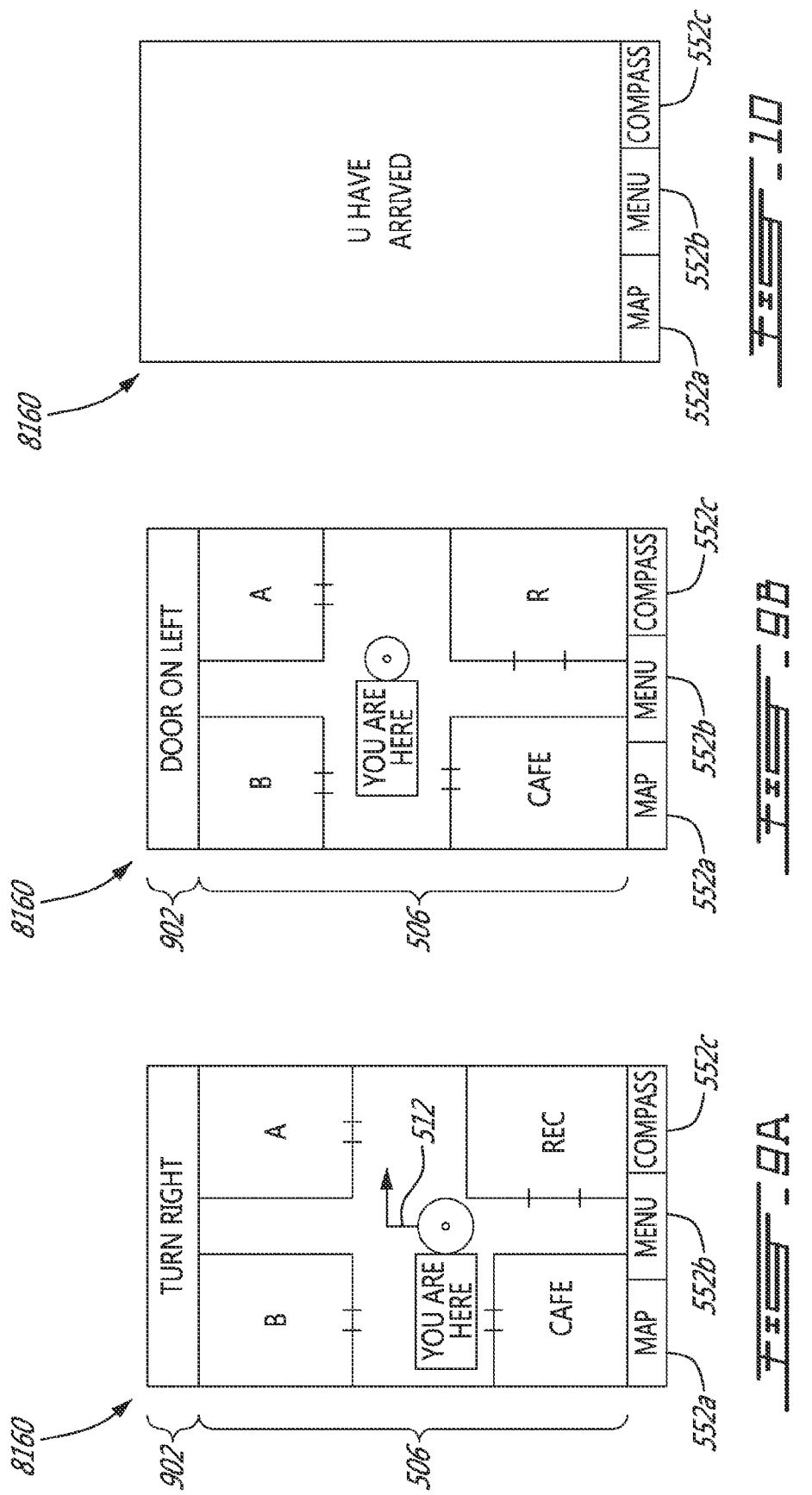

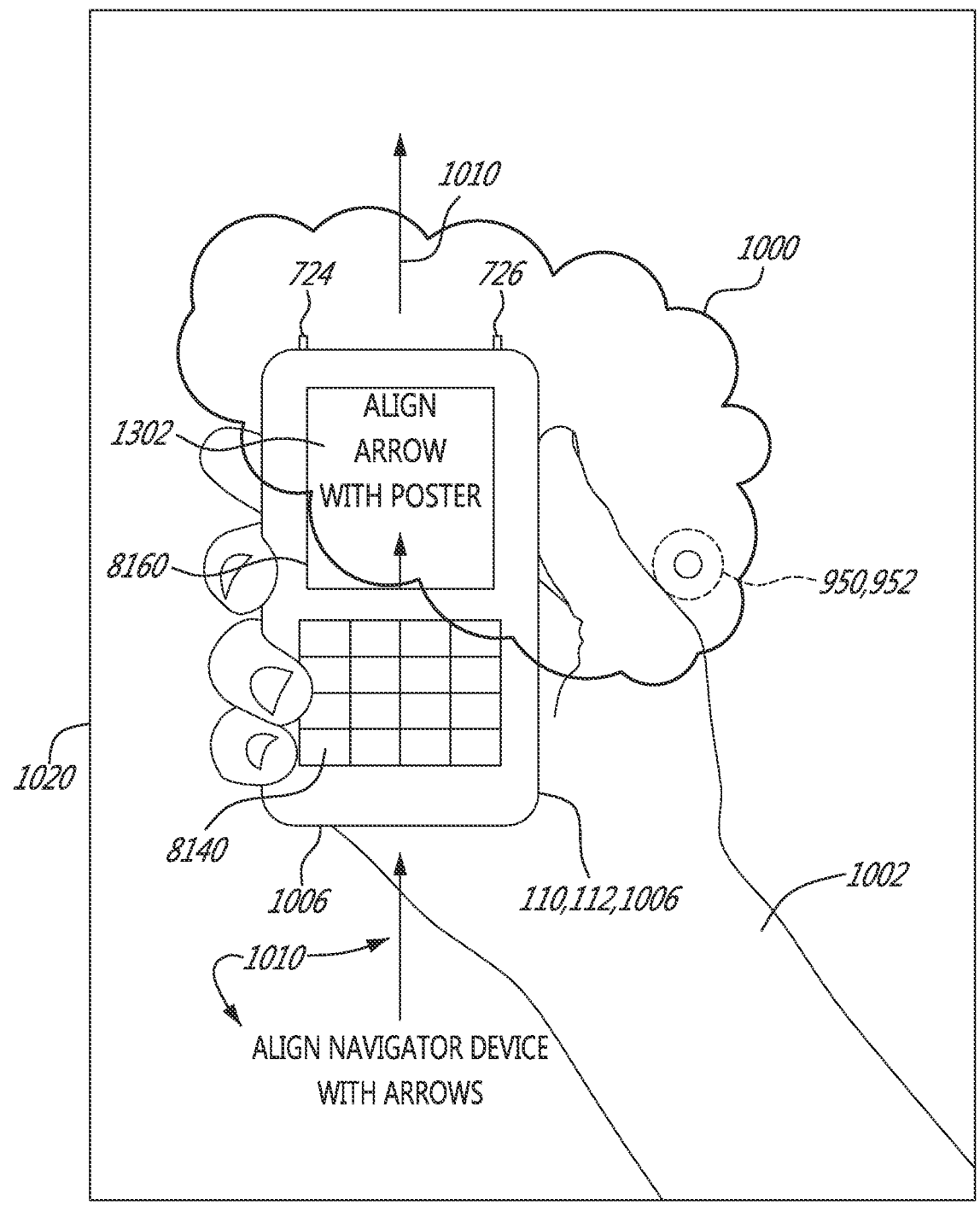

SYSTEMS AND METHODS FOR INDOOR NAVIGATION

CROSS REFERENCE TO RELATED APPLICATION

This application claims all benefit, including priority, of U.S. Provisional Patent Application Ser. No. 61/729,793, filed 26 Nov. 2012 and entitled Systems and Methods for Indoor Navigation, the entire contents of which are incorporated herein by this reference.

FIELD OF THE DISCLOSURE

This application relates to the field of navigation, and more particularly to systems and devices useful for navigation using wireless handheld devices.

BACKGROUND

A recent trend in mobile communications has been to incorporate Near Field Communication (NFC) and other short-range wireless communications protocols into mobile devices and other communications systems and components. NFC and other short-range communications devices can initiate and execute fully and/or semi-automatic wireless data transfers by being brought into or otherwise placed in sufficiently close proximity to each other, or in some embodiments by brief, controlled contact, which is sometimes referred to as device "kissing."

Systems, devices, and methods adapted for NFC and other short-range communications processes can be applied in a wide variety of uses. Such uses can, for example, include indoor and other forms of navigation where wide-area navigation signals are not available, or where it is desired to provide redundant navigation options.

DESCRIPTION OF DRAWINGS

Examples of various aspects and embodiments of the invention are shown in the drawings, and described therein and elsewhere throughout the disclosure. In the drawings, like references indicate like parts.

FIGS. 1-3 and 13 are schematic diagrams of systems and devices useful in implementing various aspects of the disclosure.

FIG. 4 is a schematic flowchart diagram of a process suitable for implementing various aspects of the disclosure.

FIGS. 5-12 are schematic diagrams of device user interfaces suitable for use in implementing aspects of the disclosure.

DETAILED DESCRIPTION

Figure 11:
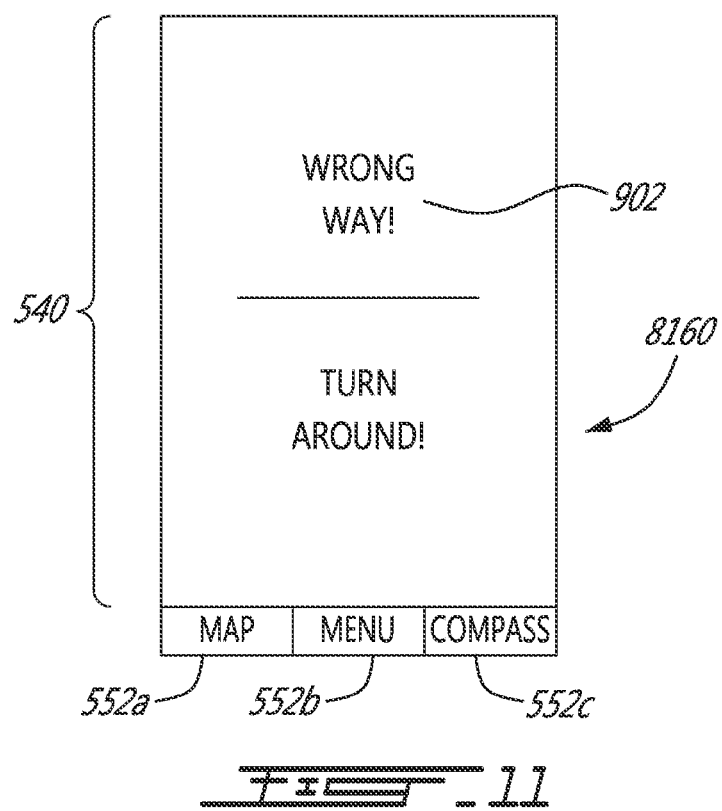

In various aspects and embodiments, the disclosure provides systems, methods, devices, and computer programming products, including non-transient machine-readable instruction sets, for indoor navigation using passive and/or active NFC-capable devices.

For example, in one aspect the disclosure provides wireless handheld devices comprising controllers configured to detect proximity of an external data storage device, and to initiate a data transfer with the detected external data storage device, the data transfer comprising reading of position identification data. Such devices further comprise one or more processors configured to determine, based at least partly on said position identification data, a device reference position within a roofed structure; and, at the time of reading of the position identification data, set a device reference orientation. They further comprise one or more inertial and/or magnetic sensors configured to generate, for processing by the at least one processor, signals representing at least one inertial condition of the wireless handheld device subsequent to the reading of the position identification data; and to determine, using at least the device reference position, the device reference orientation, and the at least one inertial condition, a subsequent estimated position, and optionally orientation, of the wireless handheld device.

In further aspects, the disclosure provides systems, methods, and computer programming products, including non-transient machine-readable instruction sets, for use in implementing such devices.

In further aspects, the disclosure provides passive NFC devices useful for implementing indoor navigation processes.

Near-field communication(s) (NFC) are wireless communications between two or more suitably-configured devices when the devices are placed or otherwise disposed within a desired, typically relatively proximity to one another. Such communications can, for example, be initiated on a fully or partially automatic basis when the two or more devices are placed within desired proximity of one another, and can occur between any two or more of active and/or passive NFC devices.

As will be appreciated by those skilled in the relevant arts, once they have been made familiar with this disclosure, NFC communications in accordance with this disclosure can be conducted according to any suitable protocols, including a number of protocols now in widespread public use, as well as protocols yet to be developed.

In general, an NFC transaction, or data transfer, may be initiated by bringing two or more NFC-enabled devices into close proximity of one another. "Close proximity" can, as will be apparent to those skilled in the relevant arts, once they have been made familiar with this disclosure, mean any proximity suitable to a desired purpose, for example, sufficient to allow at least one low-powered active communication device to initiate communications exchange(s) with at least one other active and/or passive device; and typically means sufficiently close that it may be presumed that communications between the two or more NFC devices is desired by users of one or both devices. For current NFC applications, for example, "close proximity" can mean one or several centimeters, or shorter or longer distances, depending for example upon the purpose and nature of the NFC transaction and the NFC-enabled devices. The action of bringing such NFC-enabled devices into sufficiently close proximity may trigger automatic or semi-automatic activation of an NFC circuit, and/or an NFC communication.

For purposes of this disclosure, NFC communications may be conducted according to any desired wireless communications protocol(s), including for example those published or otherwise adopted by the various NFC and/or Radio Frequency Identification (RFID) industry federations, councils, groups, forums, and boards, and their members, as well as any or all of Bluetooth or WiFi wireless protocols, including for example any or all of Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), GSM, 3GPP, 4G, or other wireless protocols.

An example of an NFC system 100 suitable for use in implementing various aspects of the disclosure is shown in FIG. 1. In the embodiment shown in FIG. 1, system 100 comprises two active NFC devices 110, in the form of smartphones or other wireless handheld or mobile devices 120. Bringing active NFC-capable devices 110, 120 close enough together, by for example moving them physically toward each other into relatively close proximity, which may include actual physical contact, can initiate automated process(es) configured for an operationally easy set-up of communications interfaces, e.g. data transfers, data communications sessions, or other processes; and thereby initiate a wireless NFC connection.

For example, in the embodiment illustrated in FIG. 1, relative movement of the devices 110, 120 toward one another may induce Hall effect(s) in magnetic field sensor(s) incorporated within one or both of the devices, and so trigger execution of an NFC query and authorization process and, conditioned upon authorization, establishment of uni- and/or bi-directional wireless communication session(s) between the devices. In one non-limiting example, one or both of devices 110, 120 is provided with either a magnet 724 or a magnetometer, i.e., a magnet sensor 726, such as a Hall effect sensor or magneto-resistive sensor, or both. The devices 724, 726 may be matched in a single touch or other gesture adapted to bring the devices into suitably close proximity (sometimes termed a "kiss" gesture because the two devices 110, 120 typically touch or "kiss" each other or are very close and in adjacent proximity).

An example of a suitable proximity for such embodiments may be in the range of about 10 to 20 mm, depending for example on the size and/or strength of magnet(s), magnetic field sensor(s), and/or other device(s) used to initiate communications, but the range may be more or less depending on the strength of the magnets and/or the purposes for which the device(s) 110, 120 and/or system 100 is intended. The sensor(s) 726 on each device 110, 120 may be aligned to the magnet on the respective other device, as illustrated in FIG. 1. One or both of the sensors 726 can sense ("see") the corresponding magnet 724 pursuant to the Hall effect, causing a voltage variation or other signal to be generated by the sensor and transmitted to a processor on board the device(s) 110, so as to activate an NFC circuit to communicate with the other device using the protocol of an associated NFC Stack or other wireless communications) subsystem or device(s). The devices 110 can then communicate with each other using any NFC protocol suitable for the intended purpose.

Establishment of NFC communications sessions between the devices 110, 120 can be conditioned on any suitably-adapted authorizations, using, for example, PIN numbers and/or other security keys.

Interaction between active NFC devices 110 as shown, for example, in FIG. 1, can be considered an example of peer-to-peer NFC interactions.

FIG. 2 illustrates an example of another NFC system 100 suitable for use in implementing various aspects of the disclosure. In the embodiment shown in FIG. 2, system 100 comprises an active NFC device 110, in the form of a smartphone or other wireless handheld or mobile device 120, and a passive NFC device 950 such as an RFID or other NFC tag affixed to an NFC poster. Bringing an active NFC-capable device 110, 120 close enough to a passive device 950 such as a tag can cause query, authorization, and/or other data transfer processes to fully or semi-automatically execute using magnets, Hall effect sensors, and/or other proximity-detecting mechanisms as described above and elsewhere herein.

A passive NFC device 950 can comprise one or more memory(ies), including both volatile and/or persistent (i.e., non-transient) media for storing data readable by active NFC device(s) 110. Data stored by passive device(s) 950 and read by any suitably authorized and/or otherwise capable active device(s) 110 can include any data suitable for any desired purpose(s). For example, a passive device 950 affixed to an informational document such as an advertising or instructional poster can store, for reading by one or more active device(s) 110, any information desired to be imparted to the device(s) 110 and/or users thereof. For example, a device 950 affixed to an advertising poster can store information related to a product, such as an item of clothing, an entertainment event, or a food product purchasable by a user of a device 110.

Alternatively, or in addition, a device 950 can store data such as a uniform resource locator (URL) or other address information, such as a telephone number, readable by active device(s) 110 and suitable for directing a processor associated with the device(s) 110 to establish one or more uni- or multi-direction communications sessions with commonly-controlled and/or third-party resources via one or more networks 900, as shown in FIGS. 2 and 3.

Such networked resources can, for example, include vendor, enterprise, or other servers, computers, smartphones, etc., as shown for example in FIG. 3.

A somewhat more general embodiment of a system 100 suitable for use in implementing NFC communications and/or various other aspects of the disclosure is shown in FIG. 3. In the embodiment of FIG. 3, an active wireless handheld device 110, 120 is configured for communication with a wide variety of external devices via a number of communications (sub)systems. For example, using an NFC (sub)system 8132, the device 110 is configured to communicate with any one or more of passive NFC device(s) 950, such as RFID or other NFC tags; optionally non-mobile active device(s) 110, such as stationary computers or other devices, including for example vendor point-of-sale transaction devices); and/or NFC-capable mobile devices 120 such as smartphones and/or laptop, palmtop, and/or tablet computers.

As explained further below, the device 110, 120, 8120 shown in FIG. 3 is further capable, via wireless communications (sub)system 8101, of voice and/or other data communications with a wide range of devices, including for example server(s) 912 and/or other computers 914 via the internet, the public switched telephone network (PSTN) and/or other wired wide-area or local-area public or private network(s) 900, and/or one or more smartphones, computers 914, servers 912, and other active systems 110 via cellular and/or other wireless telephone networks. For example, an active NFC device 110, 120 may be communicatively coupled to one or more wireless local area networks (WLANs), such as a Wireless Fidelity (WiFi) network, or a wireless wide area network (WWAN) such as 3GPP or 4G Long Term Evolution (LTE) network (not shown). By way of non-limiting example, and as will be appreciated by those skilled in the relevant arts, WiFi is typically deployed as a WLAN that may extend home and business networks to wireless medium and may follow an IEEE 802.11 or other standard. A wireless communications connection may also be established using, for example, short-range communications subsystems which may include an infrared device and associated circuits and components as described above, or a Bluetooth communications module, to provide for communication with similarly-enabled systems and devices as well as the NFC communications.

FIG. 3 shows a non-limiting example of a selection of various functional (sub)systems or other components that may be included in handheld or other mobile wireless communications device(s) 120 suitable for use in implementing the disclosure. In the example shown, device 110, 120 includes, among other components, housing(s) 8120; input device(s) such as keypad(s) 8140, microphone(s) 8112, accelerometer(s) 8137, analog/digital (a/d) converter(s) 8138, touchscreen display(s) 8160, hall effect or other field/proximity sensor(s) 8134, 726, gyroscope(s) 8240, and global positioning system(s) (GPS(s)) 8242; output device(s) such as touchscreen or other display(s) 8160, speakers(s) 8110, and magnet(s) or other field/proximity generator(s) 8135, 724; and input/output (I/O) device(s) such as uniform serial bus (USB) auxiliary input/output port(s) 8106, parallel or serial port(s) 8108, NFC (sub)system(s) 8132, including Bluetooth and/or other short-range communication (sub)system(s), and wireless/radio transceiver (sub)system(s) 8101.

As will occur to those skilled in the relevant arts, device(s) 110, 120 may include any of a wide variety of these and other components and (sub)systems, in any desired combination(s); and they may interact in any of a wide variety of ways, in addition to those described herein.

As will further be understood by those skilled in the relevant arts, handheld device(s) 120 can comprise any of a very wide range of mobile devices, including for example cellphones, smartphones, and other radio-based communications devices, as well as laptop, palmtop, and tablet computers. "Handheld" means portable and operable using one or both hands; and, in the case of smart phones, can but does not necessarily mean devices that are roughly the size of an average human palm.

One or more processors 8180, 8158, 8138, 8132(*a*), etc., working singly or in any desirable or otherwise suitable combination(s), can use inputs generated and/or otherwise provided by any one or more of the various input device(s) 8140, 8112, 8137, 8138, 8160, 8134, 8240, 8242, 8106, 8108, 8132, 8101 and locally and/or remotely-accessible peripheral devices, such as printers, servers, telephones, computers, etc., to generate, according to suitably-configured logic rules, output signals suitable for processing by any one or more of the various output device(s) 8160, 8110, 8135, 8106, 8108, 8132, 8101, and locally and/or remotely-accessible peripheral devices, etc.

Any or all of processor(s) 8180, 8158, 8138, 8132(*a*), etc., along with any other desired components and/or (sub)systems incorporated, by a device 120 may be protectively and/or functionally contained within housing 8120(*s*) and communicatively coupled, as for example by means of suitably-configured buses, etc., between the various memory, input, output, and auxiliary devices (such as battery(ies), solar power generators, etc) in order to perform the various functions disclosed herein. Processor(s) 8180, 8158, 8138, 8132(*a*) may be of any suitable form(s). For example, CPU(s) 8180 may comprise one or more microprocessors chip contained on or otherwise attached to one or more circuit boards within housing(s) 8120. CPU(s) 8180 can provide general command and control functions including, for example, operation of the display 8160, as well as the overall operation of the mobile device 810, in response to received information and inputs, such as in response to actuation of keys on the keypad 8140 by the user. Processors, 8158, 8138, 8132(*a*), etc., may be provided to control specialized functions such as operation of NFC and other particular communications channels.

Logic rules suitable for use by processors 8180, 8158, 8138, 8132(*a*) in generating such outputs can be accessed from any suitable locally and/or remotely located source(s), including, for example, any one or more applications modules 8130A-N, 8244, etc., as, for example, explained herein. Such rules and modules can be provided in any form(s) suitable for achieving the purposes addressed herein, including for example software instructions stored in transient (volatile) and/or non-transient (persistent) memory(ies), firmware, and hard-programmed hardware device(s) or component(s).

Memory(ies) 8118, 8116, etc., which can be of any form compatible with the purposes disclosed herein, including, for example, flash, EEPROM, RAM, ROM, disk, register, etc., can be accessed, controlled, and otherwise used 8180, 8158, 8138, 8132(*a*), etc., for reading data used in the various processes described herein, for storing output so generated, and for holding executable forms of suitably-configured application and/or module instruction sets. Such stored data may, for example include operating system and other software executed by the processing device 8180.

As shown in FIG. 3, an active NFC device 110 can comprise multiple communications abilities, and thus may have the ability to conduct concurrent communications sessions with other devices 110, 950, 912, 914, etc., using NFC voice, and/or other communication means. For example, as illustrated, NFC capable device 110 may be engaged in peer-to-peer communication with a second NFC capable device 110, while also communicating with a baseband access point 912, 914, which may take the form of a cellular base station, for example.

Long-range (e.g., cellular) voice and/or text communications processes may be provided for an active device 110, 120 by one or more wireless communications subsystems 8101, comprising transmitter(s) 8152, 8156, receiver(s) 8150, 8154, and digital signal processor(s) (DSP(s)) 8158.

Short-range communications may be provided by either or both of NFC subsystem(s) 8102, 8132, which may or may comprise dedicated antenna systems for short-range aspects; specialized memory device(s) 8116, 8118, and other device subsystems 8121.

Mobile device(s) 110, 120 in accordance with the disclosure may therefore be considered, in the examples shown, example, two-way RF communications devices having voice and data communications capabilities using RF circuitry. In addition, the mobile device 110, 120 may have the capability to communicate with other computer systems 110, 912, 914, etc., via the Internet or other network(s) 900. For example, a device 110, 120 may communicate with one or more servers 912, such as Internet servers, via RF subsystems 8101 and the associated components, including web module 8130*e*, and further via short-range communications subsystem(s) 8102, such as via web/browser module(s) 8130*e*. System(s) 8102 may include, for example, one or more Bluetooth communications modules for establishing Bluetooth wireless connection(s), and other communications modules, such as infrared modules or devices, WiFi circuits and modules, and associated components and circuits that may also form part of the RF circuitry.

A predetermined set of applications that control basic and optional device operations, such as data and voice communications 8130A and 8130B, may be installed on the device 110, 120 during manufacture; and others may be installed later using any suitable applications installation processes, many of which are currently in widespread commercial use. Application modules 8130A-N may include native and non-native modules for security 8130D, Web interaction 8130E, social interactions or applications, and the like.

NFC communications module(s) 8130C may include hardware and/or software to enable NFC controller(s) 8132A (which may themselves include hardware, software, and firmware a required) and with the microprocessor 8180, to perform NFC communications tasks, such as through the memory 8116. NFC communications module(s) 8130C may, in various embodiments, support responsive operability for tag 950 reads/writes, whether virtual or physical, by interacting with other modules and apps to affect data stored on tag(s) 950, and/or to obtain or write tag data. Such other modules may for example include web module 8130E, PIM module 8130F, and other software modules 8130N (such as apps and video players, by way of non-limiting examples). Microprocessor(s) 8180 may also cooperate with NFC module(s) 8130C, and with NFC subsystem(s) 8132, which may include one or more NFC chips comprising NFC controller(s) 8132a, and antenna(s) 8132b to facilitate communications with other active and/or inactive NFC device(s) 110, 950, as discussed herein. For example, an NFC communications module 8130C may allow a microprocessor 8180 to control the NFC subsystem 8132 and/or memory stores 8116, 8118.

NFC chips suitable for use in implementing aspects of the disclosure may, for example, comprise one or more PN531 microcontroller-based transmission modules produced by Koninklijke Phillips Electronics N.V., or other similar products. Any chips consistent with the purposes contemplated herein will serve. Such NFC chips 8132a may, for example, include both digital and analog circuitry, and one or more contactless Universal Asynchronous Receiver Transmitters (UARTs), cores, and host interfaces. Incorporated circuitry may include output drivers, integrated demodulators, bit decoders, mode detectors and RF-, magnetic, and/or level detectors as suitable. Suitable contactless UARTs may include elements for data processing, Cyclical Redundancy Checking (CRC), parity generation, framing generation and check bit coding and decoding, and/or other functions. Cores may, for example, include one or more 80051 microcontroller, 32 Kbytes or other amounts of ROM and, one Kbyte or other amounts of RAM, for example. A set of host interfaces may interface with the microprocessor and interface according to such known standards as I2C, serial UART, SPI and USB. NFC circuits may be tuned to any frequency(ies) suitable for accomplishing the purposes disclosed herein, as for example about 13.56 MHz.

NFC (sub)system(s) 8132 may include and/or otherwise cooperate with one or more magnets/magnetometers or other magnet sensors 8134, such as Hall effect sensors, communicatively connected to the microprocessor 8180, 8132a. Sensor(s) 8134 may include components suitable for operation as a Hall effect sensor, including any necessary coils or other circuits. There is also illustrated a magnet/magnetometer 8135 that, in various embodiments, may be advantageously be provided in the form of one or more electromagnets and may operates with microprocessor(s) 8180, 8132a, etc., to allow one or more alternate communications pathways using electromagnetic energy, which may be changed to correspond to changing data. Electromagnet(s) 8135 may perform a variety of different functions, including working as an active or passive device in association with other components of the device 110. For example, when an electromagnet 8135 is used instead of a permanent magnet (non-electromagnetic) in the devices of FIG. 3, a pulse of energy may be delivered to the Hall effect sensor in another device. The other device receiving the pulse may accordingly activate its NFC circuit. A WiFi connection, for example, in the alternative may be established if an NFC and/or Bluetooth connection is not established. Other modules 8130N may include, for example, software that interoperates with the magnetic sensor 8134 and any magnet or electromagnet 8135 or other magnetic circuitry that may be included within the overall electromagnet 8135.

In addition, the personal information manager (PIM) application module 8130F may be or include a native module installed during manufacture. The PIM is capable of organizing and managing data items, such as email, contacts, calendar events, voice mails, appointments, and task items. The PIM application is also capable of sending and receiving data items via a wireless network. The PIM data items are seamlessly integrated, synchronized and updated via the wireless network with the device user's corresponding data items, such as may be stored in the cloud or as may be associated with a host computer system, for example.

Communication functions, including voice and/or other data communications, may be performed through the communications subsystem 8101, and/or through the short-range communications subsystem 8102, which may be part of the circuitry contained in device 810. The specific design and implementation of the communications subsystems 8101 and 8102 may be dependent upon the communications network in which the mobile device 810 is intended to operate.

Such communication functions may, as referenced above, be carried out by data module 8130B, voice module 8130A, and web module 8130D, including at the instruction of NFC module 8130C in accordance with the disclosed embodiments, with security for these communications, such as in the granting of access to PIM module 8130F, overseen by a security module 8130D. A security module 8130D may include one or more native or non-native security applications, including anti-virus/anti-malware applications or functions, and protection of PIM information via applications or functions, during external interactions, may occur via NFC or via the Web, for example. Accordingly, security module 8130D may allow for degrees of security in interacting with other devices, such as the aforementioned tags, and/or other devices such as servers (herein defined to include any device acting as an Internet, intranet, extranet, or other public or private network node, host, server, or the like), and particularly with devices or aspects of a device that enable the occurrence of communication exchanges by the device occur over a network, such as the Internet.

As previously noted, NFC processes suitable for use in implementing the various processes disclosed herein may be conducted according to any of a wide variety of wireless, short-range communications protocols. Such protocols typically comprise sets of standards to enable devices 110, 120, such as smartphones and the like, to establish radio communication with each other by bringing them into close proximity, or by touching them together. Applications include wireless data transactions and simplified setup of communication sessions involving other communication technologies, such as Wi-Fi and Bluetooth. Communication is also possible between a powered NFC device and a powered or unpowered NFC "tag" or button. Suitable standard currently in use are have been p promulgated by the NFC Forum, which was founded in 2004 by Nokia, Philips and Sony, and which now has more than 160 members. The NFC Forum also promotes NFC and certifies device compliance.

Standards have been developed that cover both NFC Forum—sanctioned communication protocols and other short-range wireless data exchange (NFC) formats. Specifically, an example of NFC standards ISO/IEC 18092/ECMA-340; Near Field Communication Interface and Protocol-1 (NFCIP-1); ISO/IEC 21481/ECMA-352; and Near Field Communication Interface and Protocol-2 (NFCIP-2). NFC also encompasses a variety of pre-existing standards including ISO/IEC 14443 both Type A and Type B, and FeliCa. The standards specify the NFC air interface, modulation schemes, coding, transfer speeds, and frame format of the RF interface of NFC devices. The standards also comprise initialization schemes and conditions required for data collision-control during initialization for both active and passive NFC modes. In addition, they define a transport protocol, including protocol activation and data-exchange methods.

NFC protocols sanctioned by the NFC forum typically operate within a globally available and unregulated radio frequency band of 13.56 MHz, and generally have a working distance of up to about 20 centimeters. Three data rates are currently defined in the NFC standards: 106 kilobits per second (kbit/s); 212 kbit/s; and 424 kbit/s.

In addition, the NFC Forum has defined a common data format called NFC Data Exchange Format (NDEF), which can store and transport various kinds of items, such as MIME-typed objects and URLs. The NFC Forum also added the Simple NDEF Exchange Protocol for sending and receiving messages between two NFC-enabled devices.

All of the above-mentioned standards and formats, along with any other existing and applicable NFC standards, are incorporated herein by reference as if fully set forth in their entirety, in their finalized condition.

Both passive and active communications modes have been defined. In active communication modes, both an initiator device and a Target device may generate their own NFC fields 1000 (see e.g., FIGS. 1 and 2). The initiator device may start the NFC communication, with the target device responding to commands received from the initiator device, as appropriate, by modulating the NFC field 1000 generated by the Target device.

Between two active NFC devices 110, either or both devices can act as either initiator or target. In passive communication mode, one of the devices lacks, or does not employ an ability to independently create an electro-magnetic NFC carrier field 1000, and therefore generally does not serve as an initiator.

As previously noted, systems 100, and devices 110, 120, 950 in accordance with the disclosure can be used to significant advantage in a very wide variety of applications. As a particular example, the disclosure herein provides systems 100, devices 110, 120, 950 that enable improved navigation techniques.

FIG. 4 provides an example of a process 400 useful for improved navigation in locations where wide-area broadcast navigation signals, such as GPS signals or other navigational signals, may be wholly or partially available, or where it may be otherwise advantageous to use navigation systems that do not rely on triangulation and other process(es) which rely on the use of multiple widely-available signals. An example of an application which may be particularly advantageous is the enablement of indoor or other navigation where a man-made or natural roof structure, or other barrier, prevents receipt of GPS and other wide-area navigation signals.

Process 400 of FIG. 4 is suitable for implementation using devices 110, 120, and/or 950 in accordance with the disclosure herein, and particularly by active devices 110, 120 comprising one or more accelerometers 8137, gyroscopes 8240, and/or other inertial sensors.

At 402 in FIG. 4, a destination 502 (see FIG. 5; e.g., "Conference Room A" 802 of FIG. 8) is designated as a target for navigation in a given, preferably mappable area such as the interior of a building or other roofed or shielded structure.

For example, a user 1002 (FIG. 13) of an active NFC device 110, 120, 1006 (hereafter referred to for clarity simply as device 1006; see FIG. 13) in accordance with the disclosure may enter, or otherwise approach, a building in which the user has a meeting or other appointment. Upon so doing, the user 1002 may use any one or more of a keyboard/keypad 8140, touchscreen 8160, etc., of the user's active NFC device 1006 to call up and display a list 504 (FIG. 5), map 506, or other menu or representation of authorized destination(s) within the building. For example, the user may approach a first active or passive target NFC device 110, 950, 952 (hereafter simply 952, for clarity) located within the building, e.g., in a vestibule or reception area, and place his/her active NFC device 1006 in sufficient proximity within an NFC field 1000 generated wholly or partly by the target NFC device 952 to cause an NFC (sub)system 8132 of the user's device 1006 to initiate an NFC communications session with the first target NFC device 952, as shown in FIG. 13. As a part of the communications session thus initiated, the user's active NFC device 1006 can access a data set resident in memory of the target device 952 to either directly read data sufficient for generating the list or map 504, 506, or to read data sufficient to refer the device 1006 to another resource 912, 914, etc., from which such data is available.

Continuing the example of designating a navigation target 502/802, the user's NFC device 1006, having directly or indirectly accessed data sufficient to generate a list 504 and/or map 506, can generate and display such list 504 and/or map 506 on one or more displays 8160 of the user's NFC device 1006. See, for example list 504 of FIG. 5, and map 506 of FIG. 8, respectively. The user 1002 can then, using keypad 8140, touchscreen 8160, and/or other pointing and selecting devices (such as a trackball 740 of FIG. 1), select the desired target destination from the displayed list, map, or other menu. Processor(s) 8180, 8132a, etc., of the user NFC device can cause data representing the selected destination to be stored in memory resident on the device, or in memory accessible by any other processors to be used in controlling the indoor navigation process.

Having selected his/her indoor destination, at 404 the user 1002 can approach another NFC, or other target external data storage device, or remain close to the same device 952 and, by placing or keeping his/her NFC device 1006 in proximity to the device 952 sufficient to maintain the NFC session or establish a new one, at 406 can cause or otherwise enable the user NFC device 1006 to read position identification data from the target external data storage device 952. Again, the position identification information can be stored directly on either or both of the NFC device(s) 1006, 952, and/or may be provided by one or more remote resource(s) 912, 914 to which the NFC device 952 directs the NFC device 1006. Position identification information acquired at 406 can, for example, represent two- or three-dimensional grid or other coordinates within the building associated with the location of the NFC target device 952, or any other suitable location identification information.

At 408, processor(s) such as processors 8180, 8132a of the user NFC device 1006 can, based on the position identification data read at 406 and any other desired information, determine a reference position associated with the current position of the user NFC device 1006 within the building. For example, the reference position determined at 408 can represent two- or three-dimensional grid or other coordinates within the building of the NFC target device itself, or of a projected or otherwise estimated location of the user device 1006, based for example on any observed or estimated offset between the location of the user device 1006 and that of the target NFC device 952.

With the user NFC device in position to read the position identification data, at 410 the user NFC device can determine a reference orientation of the user device 1006. For example, based on signals or other data received from inertial sensor(s) such as one or more accelerometers 8137, gyroscopes 8240, magnets and/or sensors 724, 726, 8134, 8135, etc., and any other suitable information, if any, representing a current inertial condition (or conditions) of the device 1006, one or more processors such as either or both of processors 8180, 8132a of the user NFC device 1006 can determine a current 3-dimensional spatial orientation of the user device.

For example, a user 1002 of an active NFC device 110, 112, 1006 can approach a poster or other substrate 1020 mounted on a wall, table, or other location within the building, or other device having both a passive target NFC device 950, 952 and an index or indicia 1010 printed or otherwise displayed thereon indicating a preferred initialization orientation for user navigation devices. Upon approaching the poster 1020, the user 1002 can hold the device 1006 in the indicated orientation relative to the index or indicia 1010 until the device 1006 has had time to read and/or otherwise establish the position identification data at 404, establish one or more current inertial condition(s), and, using at least the established inertial condition(s), establish a reference orientation at 410.

For example, as shown in FIG. 13, a user 1002 can approach an NFC-enabled poster 1020 to initiate an NFC orientation session. In doing so, the user 1002 can, as directed by indicia 1010, hold his/her device 1006 in an upright orientation (i.e., facing away from the wall on which the poster 1020 is mounted, with the longitudinal (X) axis of the device (see FIG. 1) 110, 112, 1006 oriented in an upright direction, normal to the floor of the building.

In so doing, the user may be aided by presentation 1302 on a display 8160 of his/her device 1006 of directions or other indicia, e.g., one or more arrows or other graphic devices (i.e., non-text images) 1010 and a direction (i.e., text-based indicia) 1010 "align arrow with poster arrow(s)", as for example shown in FIG. 13. In such and other embodiments, setting of the reference orientation by the device 1006 can be based at least partly on an algorithm which employs a presumption by the device that the device is being held in the instructed relative orientation with respect to the indicia 1010 at the time the reference orientation is set. Alternatively, or in addition, setting of the reference orientation may be based on a sensed inertial condition. For example in, either of the above cases the device 1006 can wait for a predetermined period (e.g., 0.5-3 seconds) after initial reading of position or other data from a device 950, 952 and, based on the current sensed or presumed inertial condition and/or orientation of the device 1006, set the reference orientation.

As will be appreciated by those skilled in the relevant arts, process steps 402-410, and other steps described below, can be varied in combined in a number of ways, depending upon the particular characteristics and objectives of the process(es) 400 and the system(s) 100, device(s) 110, 120, 950, 952, 1006, etc., used. For example, the step of identifying a target destination at 402 can logically and efficiently be combined with any one or more of steps 404, etc.

The user 1002 can be assisted in locating posters 1020 and/or other target NFC devices 952 through the use of wirelessly pushed display directions, as shown for example in FIG. 6. For example on entry to a building reception area and initializing a navigation application, an NFC-enabled user device 1006 can be pushed with data suitable for generating a screen 604 comprising directions to the nearest or otherwise most appropriate NFC device 952. The user can also be invited to check in, for security and/or other purpose(s), and for example automatically access a list of authorized interior destinations determined at least partly on security authorization associated with the user 1002 and/or device 1006, by being presented with a welcome page 702, with for example an invitation to check in, as shown in FIG. 7. As will be apparent to those skilled in the relevant arts, once they have been made familiar with this disclosure, a wide range of user-assistance displays may be provided to guide the user through the indoor navigation experience.

At 412, an initial location of the user device 1006 within the building, i.e., relative to either or both of the building structure and the target destination, can be determined. For example, by reading data from the device 952, the user device 1006 can directly or indirectly obtain data sufficient for building a logical map of the building, or at least relevant portions of it, including all or a part of a route from the user's current location to the designated destination, and for mapping the current location of the device 1006 onto it.

At 416, the device 1006 can determine whether the user 1002 has requested a map from the current device location to the designated target location, or whether a map is otherwise to be presented (e.g., as a default operation). If so, at 418 the device 1006 can display, for example on one or more displays 8160 of the device 1006, directional information such as a corresponding whole or partial map, as shown for example at 506 in FIGS. 8-9B, and/or a virtual compass or other graphical pointing device 1202 (see e.g., FIG. 12). By comparing the device reference position determined at 408 and the location of the destination designated at 402 to the map grid, the device 1006 can generate and display a map 506 showing both the user's current location 510 ("You are here") and the designated destination 802, as shown in FIG. 8. The display can also comprise a directional arrow 512 and/or other directional information determined by parsing the possible user pathways comprised by the map grid and mathematically determining the shortest or otherwise most preferable route to the designated destination 802.

At 420, the device 1006 can determine whether the user 1002 has requested display of text-based directions from the current device location toward the designated target location, or whether such directions and/or other directional information is otherwise to be presented (e.g., as a default operation). If so, at 422 the device 1006 can display, for example on one or more displays 8160 of the device 1006, a corresponding whole or partial list of text-based directions, as shown for example at 902 in FIGS. 8-9B. By comparing the device reference position determined at 408 and the location of the destination designated at 402 to the map grid, and by using for example inertial condition data provided by accelerometer(s) 8137 and/or gyroscope(s) 8240 as disclosed herein, the device 1006 can generate whole or partial directions by parsing one or more possible user pathways comprised by the map grid and mathematically determining the shortest or otherwise most preferable route to the designated destination 802.

As will be apparent to those skilled in the relevant arts, a user 1002 can, for example, select map and/or direction display options using suitably-configured menus and/or active display icons. Such designations can be made, for example, at initialization of a navigation application, and/or during navigation by selecting suitable-configured display icons using, for example, known point and select operations in conjunction with one or more suitably-configured interactive graphical user interface(s). Additionally, or alternatively, displays 506, 550, etc., can provide one or more suitably-configured interactive objects 552a, 552b, 552c for use in toggling, or otherwise navigating between corresponding navigation or input states; by for example selecting a corresponding object, using a touchscreen 8160 or other suitable input/output device(s) such as keypad(s) 8140 and/or other pointing and selecting devices (such as a trackball 740 of FIG. 1), as described more fully below.

After the user 1002 has walked or otherwise travelled toward a designated destination, and/or after a predetermined elapsed period, at 424 the user device 1006 can use collected inertial and/or other data to determine a subsequent location of the device 1006 using, for example, deduced reckoning (sometimes referred to as 'dead' reckoning) navigational principles.

For example, as explained above a user NFC device can be provided with one or more inertial sensors, such as accelerometer(s) 8137, gyroscope(s) 8240, and/or magnetometer system(s) 8134, 8135, etc., any one or more of which can generate signal(s) representing one or more corresponding inertial conditions, such as current linear and/or rotational accelerations along or about any of the X, Y, Z axes shown in FIG. 1. As will be understood by those skilled in the relevant arts, once they have been made familiar with this disclosure, signal(s) representing such inertial conditions may used by processor(s) 8180, 8132a, etc., in implementing deduced reckoning and/or other navigational processes.

For example, accelerometer(s) 8137 can for example comprise 1-3 axis microelectromechanical (MEMS) accelerometers for generating signals representing accelerations along one or more orthogonal Cartesian axes X, Y, Z of the user NFC device 1006, as shown in FIG. 1. As will be appreciated by those skilled in the relevant arts, by applying numerical approximations of classical rigid body or other dynamics algorithms, in conjunction with suitable deduced reckoning navigational principles, data representing such accelerations and/or other inertial conditions can be integrated, using for example digital approximations, to calculate instantaneous device velocities in the three coordinate directions, and again to obtain current X, Y, Z positions of the device 1006 within a reference frame relative to the map presented at 506, and to generate and map current user device positions within the building for user reference.

In various embodiments, accelerometer(s) 8137 can be used to detect relatively regular, sharp accelerations associated with pedestrian strides while walking, and to provide data for use by processor(s) of a device 1006 in such navigational and/or mapping processes. By using such "virtual" pedometers, together with known and/or estimated stride lengths, further possible deduced reckoning estimations of current positions may be used. Moreover, as a user proceeds from navigation checkpoint to navigation checkpoint, defined by target NFC devices 952 as described herein, estimated stride lengths associated with a specific user can be calibrated by comparing known and estimated positions to improve the accuracy of subsequent deduced reckoning intervals.

Gyroscope(s) 8240 such as microelectromechanical (MEMS) gyroscopes can be used to generate signals representing angular accelerations about the three orthogonal Cartesian axes X, Y, Z, and so to determine instantaneous angular velocities (roll, pitch, and yaw as shown for example in FIG. 1), and current device spatial orientation, and so to generate and display directions relative to the current device orientation.

Magnets/magnetometers 724, 726, 8135, 8134, etc., can also be used, in conjunction with known magnetic fields/maps within a given structure, to map current device locations within the building. Such calculations can be used in lieu of, or in addition to, inertial techniques such as those described above. Magnetic navigation techniques may be used to particular advantage to confirm and/or correct dead reckoning positions determined using the electromechanical devices and calculations described above.

Periodically, for example following each determination at 424 of a current device location and orientation, at 426 the user NFC device 1006 can compare the current determined location with the location of the designated destination to determine whether the user has arrived at the desired destination. If the user has arrived, that is, if the current location of the user NFC device 1006 is within a predetermined distance of a designated destination location (e.g., within a desired distance of a doorway to a meeting room, as shown in FIG. 9B, or at a location within the designated destination), at 428 the process 400 can terminate. Optionally, the user display 8160 can present a notification, such as "you have arrived," as shown in FIG. 10.

If the user is determined not to have arrived, at 430 a determination can be made as to whether the device 1006 is within NFC interaction proximity of the same or another target NFC device 952, such as for example a navigation way station or checkpoint comprising a poster 1020 and/or a device 952. Indoor navigation systems in accordance with this disclosure can include pluralities of navigation checkpoints, comprising target NFC devices 952 and/or associated posters 1020, distributed through the interior of a building, to provide both continuing guidance and corrected device positional data related to the user NFC device 1006.

If the device 1006 is not within NFC interaction proximity of an NFC device 952, control can return to process step 412 so that a subsequent deduced reckoning and/or magnetic or other determination of a current device position and/or orientation may be made (e.g., GPS or other triangulation-based signals may be available at one or more points on the way), and processing may proceed as described above until the user has arrived.

If the device 1006 is within NFC interaction proximity of an NFC device 952, control can return to process step 404, so that a new reference position and orientation may be determined, and the dead reckoning position of the device 1006 updated. Moreover, as mentioned above, deduced reckoning processes may be calibrated by, for example, adjusting estimated stride lengths used in conjunction with virtual pedometer readings. Similarly, estimated position algorithms based wholly or partially on interior magnetic fields can be calibrated, along with accelerometer and/or gyroscopic signal readings.

In either case, using the process steps 404-424, as described, a user 1002 of an active NFC device 110, 112, 1006 can be provided with updated maps and/or directions at numerous points in the navigation path, as shown for example in FIG. 9B.

Using such systems and determinations, the user device 1006 can determine updated position information representing a current device location within the building or other roofed structure, and provide updated maps 506 and/or directions 902 via display(s) 8160.

Figure 12:
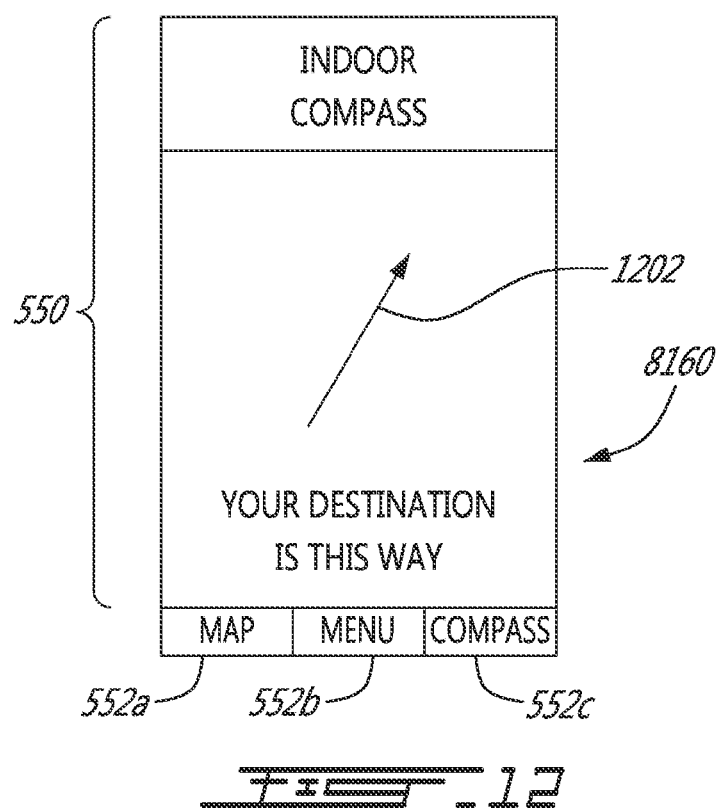

In various embodiments, it may be advantageous to provide, in lieu of or in addition to map-based displays 506 showing current, desired locations, etc., to provide displays 550 representing virtual or relative 'compasses', or other directions 902, showing for example the relative bearing of (i.e., direction to) a designated target destination, as shown for example in FIG. 12. For example, display(s) 550 can be provided as an option to a user 1002, who can toggle between map displays 506, compass displays 550, and any desired navigation menu(s) 504, etc., by for example touching or otherwise selecting one or more suitably-configured icons 552a, 552b, 552c on a touchscreen, or using other suitable input/output device(s) such as keypads 8140, pointing devices, etc.

To provide such virtual compasses or pointing devices 1202, and/or currently-relevant directions 902, it may be beneficial to use current and/or otherwise recent inertial condition information, captured or otherwise acquired as for example discussed above, to track and/or otherwise determine, on a continual or otherwise-updated basis, one or more current reference orientations of the device 1006, for use by processor(s) 8180, 8132(*a*), etc., in generating and displaying interface screen (s) 550 such as that shown in FIG. 12 to provide user-interpretable image- and/or text-based instruction(s) or indicia 902, 1202.

For example, as disclosed above, by executing algorithms employing rigid body or other dynamics algorithms, including for example appropriate integrations of linear and/or rotational accelerations, velocities, etc., processor(s) 8180, 8132 (*a*), can determine current inertial conditions, including any or all of current X, Y, Z linear position, velocity, and/or α (X-Y), γ (Y-Z), and δ (X-Z) rotational or angular orientations and/or velocities, and optionally comparison to known map or building features, to generate arrow(s) or other graphical device(s) 1202 to display on the display 550, showing the relative direction from the device 1006 in its current orientation to a current desired destination. Such orientations and/or displays can be updated in any desired recurrent manner, including for example periodic or other continual manner.

In the same or other embodiments, directions 902 provided on a display 8160 may comprise warnings 540 to the effect that a wandering user is moving away from, rather than toward, a designated destination, as shown for example in FIG. 11.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A wireless handheld device comprising:
at least one processor configured to:
    initiate a near field communication (NFC) data transfer with an external data storage device located within a roofed structure, the data transfer comprising reading position identification data from the external storage device;
    based at least partly on said position identification data, determine a device reference position within the roofed structure;
    at the time of reading of the position identification data and based at least partly on an orientation of the wireless handheld device relative to the external data storage device, set a device reference orientation; and
    display directional information regarding a target destination based at least partly on the device reference position and the device reference orientation.

2. The wireless handheld device of claim 1, further comprising at least one inertial sensor configured to generate, for the at least one processor, signals representing at least one inertial condition of the wireless handheld device subsequent to the reading of the position identification data; wherein the same or another processor is configured to determine, using at least the device reference position, the device reference orientation, and the at least one inertial condition, a subsequent estimated position of the wireless handheld device.

3. The wireless handheld device of claim 1, wherein the device reference orientation is determined at least partly based on a relative orientation of the wireless handheld device to at least one index displayed on a substrate associated with the external data storage device.

4. The wireless handheld device of claim 1, wherein the processor is configured to read position identification data automatically based on a detected proximity of the external data storage device.

5. The wireless handheld device of claim 4, further comprising an electromagnetic field sensor, wherein the detected proximity of the external data storage device is determined based at least partly on a strength of an electromagnetic field.

6. The wireless handheld device of claim 2, wherein the at least one inertial sensor comprises an accelerometer.

7. The wireless handheld device of claim 2, wherein the at least one inertial sensor comprises a gyroscope.

8. The wireless handheld device of claim 2, wherein using at least the device reference position and the at least one inertial condition to determine a subsequent estimated position of the wireless handheld device comprises using a dead reckoning process.

9. The wireless handheld device of claim 1, where the orientation of the wireless handheld device relative to the external storage device is a presumed orientation.

10. The wireless handheld device of claim 1, where the orientation of the wireless handheld device relative to the external storage device is at least partly a sensed orientation.

11. A method, performed by at least one processor of a wireless handheld device, of providing instructions for navigation within a roofed structure, comprising:
    initiating a near field communication (NFC) data transfer with an external storage device located within the roofed structure, the data transfer comprising reading position identification data from the external data storage device;
    based at least partly on the position identification data read from the external data storage device, determining a device reference position within the roofed structure;
    at the time of reading of the position identification data and based at least partly on an orientation of the wireless handheld device relative to the external data storage device, setting a device reference orientation; and
    displaying directional information regarding a target destination based at least partly on the device reference position and the device reference orientation.

12. The method of claim 11, further comprising using at least the device reference position, the device reference orientation, and at least one sensed inertial condition, to determine a subsequent estimated position of the wireless handheld device.

13. The method of claim 11, wherein the device reference orientation is determined at least partly based on a relative orientation of the wireless handheld device to at least one index displayed on a substrate associated with the external data storage device.

14. The method of claim 11, wherein reading of the position identification data from an external data storage device is initiated automatically, based at least partly on a detected proximity of the wireless handheld device to the external data storage device.

15. The method of claim 12, wherein the subsequent estimated position of the wireless handheld device is determined at least partly according to a dead reckoning process.

16. The method of claim 11, wherein the orientation of the wireless handheld device relative to the external storage device is a presumed orientation.

17. The method of claim 11, wherein the orientation of the wireless handheld device relative to the external storage device is at least partly a sensed orientation.

18. A non-transitory machine readable medium having tangibly stored thereon executable instructions which, when executed by a processor of a wireless handheld device, cause the wireless handheld device to perform a method, the method comprising:
   initiating a near field communication (NFC) data transfer with an external storage device located within the roofed structure, the data transfer comprising reading position identification data from the external data storage device;
   based at least partly on the position identification data read from the external data storage device,
   determining a device reference position within the roofed structure;
   at the time of reading of the position identification data and based at least partly on an orientation of the wireless handheld device relative to the external data storage device, setting a device reference orientation; and
   displaying directional information regarding a target destination based at least partly on the device reference position and the device reference orientation.

19. An article of manufacture comprising:
   a tangible non-transitory machine readable medium having stored thereon data representing a position within a roofed structure, the non-transitory storage medium being readable, according to a near field communication (NFC) protocol, by a processor of a wireless handheld device; and
   indicia indicating a recommended orientation for placement of the wireless handheld device during reading by the wireless handheld device of the data representing a position within the roofed structure.

* * * * *